April 16, 1968 W. R. POTZSCH 3,378,053

CUTTER HEAD FOR FORAGE HARVESTERS

Filed Feb. 23, 1966 2 Sheets-Sheet 1

Inventor.
WOLFGANG R. POTZSCH
By
Wilson, Settle, Batchelder
ATT'YS. & Craig

April 16, 1968     W. R. POTZSCH     3,378,053
CUTTER HEAD FOR FORAGE HARVESTERS Filed Feb. 23, 1966     2 Sheets-Sheet 2

Inventor.
WOLFGANG R. POTZSCH
By
Wilson, Settle, Batchelder
Att'ys. &Craig

United States Patent Office 3,378,053
Patented Apr. 16, 1968

3,378,053
CUTTER HEAD FOR FORAGE HARVESTERS
Wolfgang R. Potzsch, Wolfenbuttel, Germany, assignor to J. I. Case Company, Racine, Wis., a corporation of Wisconsin
Filed Feb. 23, 1966, Ser. No. 529,340
5 Claims. (Cl. 146—117)

This invention relates to forage harvesters, and in particular to an improved support structure for the knives of a cutting device for chopping forage material and throwing the chopped material into a receptacle.

Certain forage harvesters which are known in the art include a cylinder-type cutter head which cooperates with a shear bar to chop a crop and deliver the chopped material to a following wagon or truck. Such forage harvesters also include a crop pickup device, e.g. a windrow pickup, a cutter bar, or a corn head, which collects and moves the material back to feed rolls. The feed rolls then force the crop material into the cutting knives and hold the material while it is chopped. In one such forage harvester, the cutting blades are arranged cylindrically about a shaft and rotate past a stationary shear bar to chop the material into short lengths. There is a blowing action, either separate or combined with the knives, to propel the chopped material into the following wagon or truck as the case may be.

Certain known types of cutter heads include a support structure which clamps the cutting knives to a rotor provided in a housing. The housing has an inlet through which crop material is fed to the cutting knives and an outlet out of which the chopped material is propelled. Known support structures of this type have had too many parts for optimum economical design purposes, and in some cases unnecessary stresses have been induced in the support structure making it necessary to make parts of relatively large cross sections to withstand these stresses. In some cases it has been necessary to use higher quality materials than would be necessary if the parts were not subjected to such stresses.

It is an object of this invention to simplify the design of support structures for cylinder-type cutter heads without sacrificing strength and ruggedness characteristics.

Another object of the invention is to reduce the cost of cutter heads for forage harvesters.

A further object of the invention is to reduce the number of bolts and nuts required for fastening knives and knife holders of a cutter head with its rotor structure.

Another object of the invention is to minimize tension forces in the support structure of a cutter head for a forage harvester.

A still further object of the invention is to provide simpler parts for connecting knives and knife holders with the rotor structure in a cylinder-type cutter head for a forage harvester.

Other objects of this invention will appear in the following description and appended claims, reference being had to the accompanying drawings forming a part of this specification wherein like reference characters designate corresponding parts in the several views.

Figure 1:
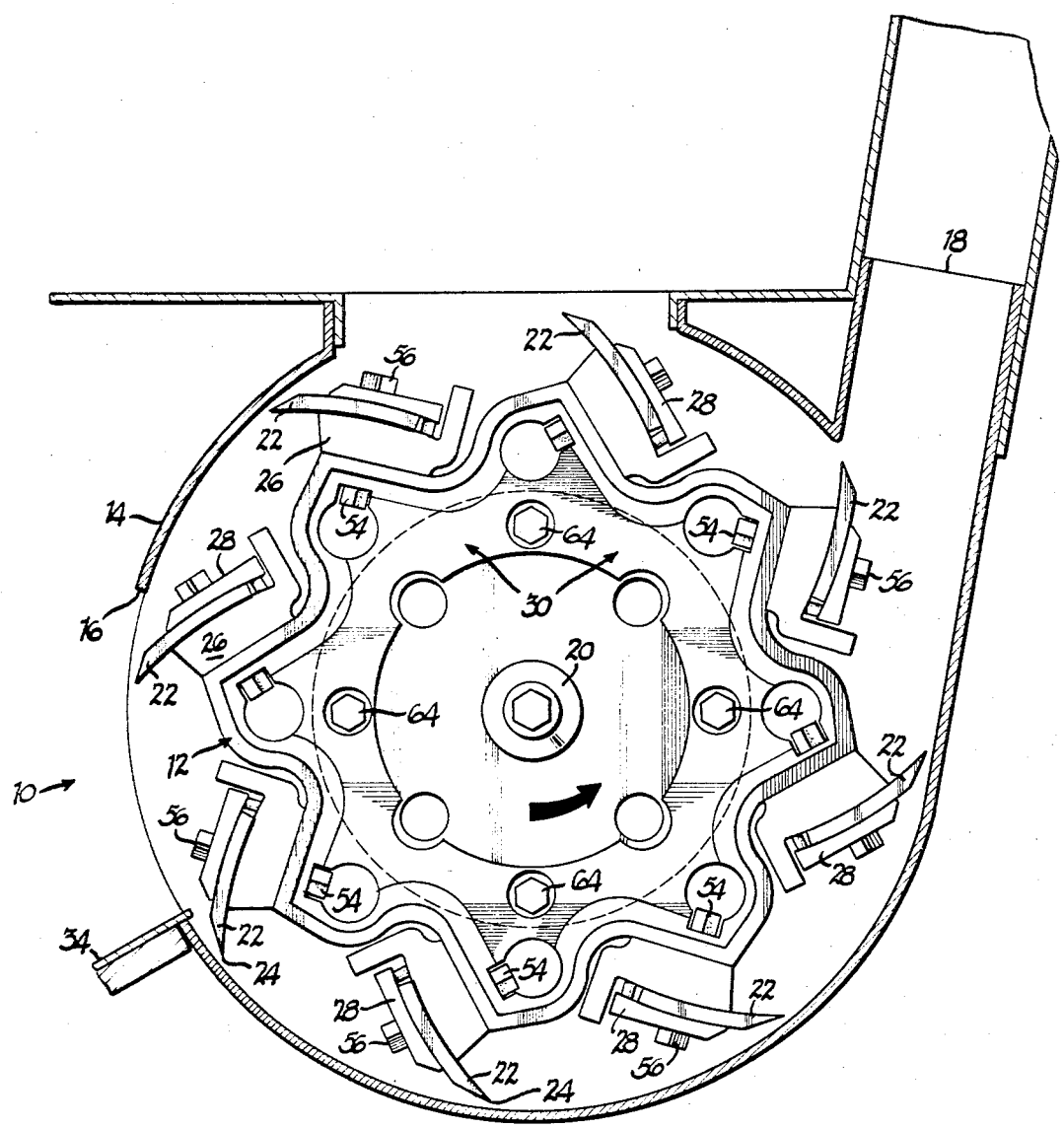
FIGURE 1 is an elevational view of a cylinder type cutter head for a forage harvester.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in the drawings:

A cutter head in accordance with the invention consists of a shaft with at least two discs affixed to it, each disc having a support ring mounted on it. The ring has seating surfaces for supporting knife holder members, and knives are clamped to the holder members and ring by overlapping knife clamping members. Only one bolt is required to connect the knives, the knife holders and the knife clamp members with the support ring. By utilizing separate knife holder and knife clamp members, a simpler support structure is provided which reduces casting problems and costs. The knife holder and knife clamp are so designed that almost no tension forces are induced in the support structure of the cutter head.

Referring to the drawings, the cutter head 10 includes a rotor 12 mounted within the housing 14 which has an inlet opening 16 and an outlet opening 18. The cutter head 10 has a shaft 20 which is journalled for rotation inside the housing 14. The cutter head includes a plurality of knives 22 each of which has a cutting edge 24 extending approximately parallel to the axis of shaft 20. Knives 22 are supported in positions spaced angularly about shaft 20 by means of separate knife holder members 26 and knife clamp members 28 which are bolted together and connected to a ring support 30 on each of the discs 32 attached to shaft 20.

The entire rotor structure 12 rotates in a counterclockwise direction as viewed in the drawings, and the knives 22 coact with a cutter bar 34 mounted near the inlet opening 16 in housing 14. Forage material which enters the housing through inlet opening 16 is chopped by knives 22 into short lengths and is then thrown by the knives out through the outlet opening 18. The cutter head cuts and blows the chopped material out of the delivery spout and into the trailing wagon or truck, and this blowing action is an integral feature of the cutter head.

Figure 2:
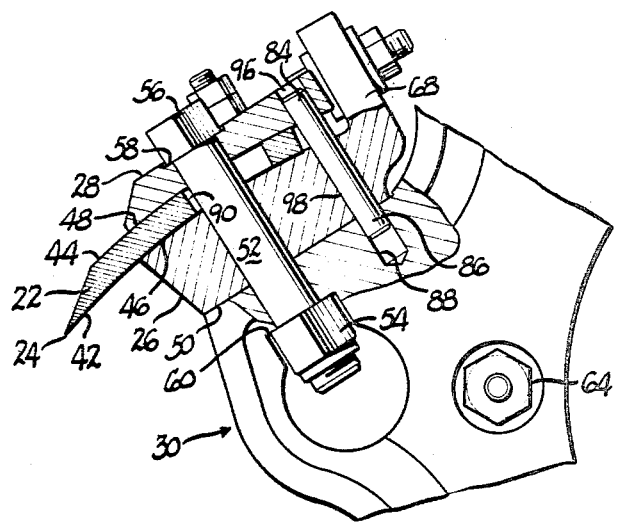
FIGURE 2 is a section showing the parts of the structure for connecting knives of the cutter head to its rotor structure.

Referring to a single knife 22 as viewed in FIGURE 2, it may be seen that in cross section, knife 22 has curved surfaces 42 and 44 on its opposite faces. The concave surface 42 seats against a convex surface 46 on knife holder member 26, and the convex knife surface 44 seats against a concave surface 48 on the knife clamp member 28. The knife clamp 28, the knife 22 and the holder 26 are all connected together and to a flat surface 50 of a ring support 30 by means of a single bolt 52 and nut 54. The head 56 of bolt 52 fits in a small recess 58 at the exterior side of knife clamp 28, and the shank of the bolt 52 extends through aligned openings in clamp 28, knife 22, holder 26 and support ring 30. Nut 54 is threaded on the opposite end of bolt 52 and seats against a recessed surface 60 on the underside of ring 30. The support ring, in turn, is fastened to one of the discs 32 by other bolts 64. It is evident that the clamp, knife and holder are relatively simple parts; that is, easy to manufacture and having no complicated structural features.

Figure 3:
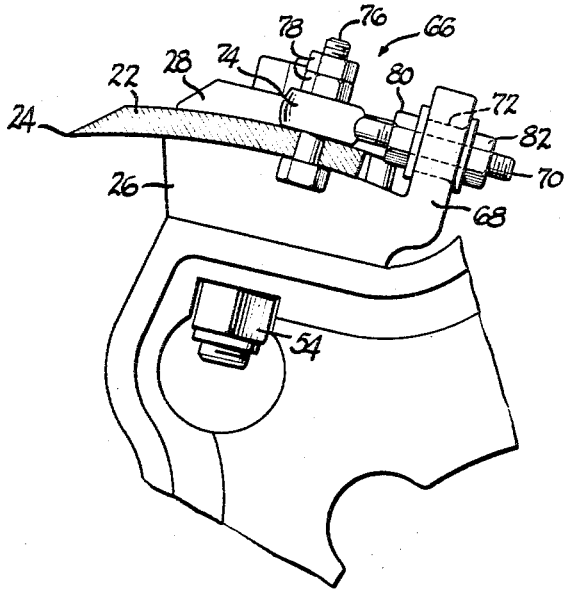
FIGURE 3 is another sectional view further illustrating the connecting structure for the knives.

In order to maintain a proper cutting relation between the knives 22 and the stationary shear bar 34, it is necessary to have some means of adjusting the knives in the radial direction of the rotor 12 to take up clearance resulting from wear. This may be accomplished by manipulation of the adjusting device 66 shown most clearly in FIGURE 3. The latter device includes the laterally extending arm portion 68 of holder member 26, and an eye bolt 70 which extends through an aperture 72 in arm 68. Bolt 70 has an eye-type head 74 which is fastened to knife 22 by a bolt 76 and a nut or nuts 78 as shown. The shank of bolt 70 extends through the aperture 72 in arm 68, and nuts 80 and 82 on opposite sides of arm 72 are tightened so as to connect bolt 70 to arm 68. By manupulation of nuts 80 and 82, bolt 70 may be moved axially of itself to in turn move knife 22 outward or inward with respect to the axis of the rotor.

During the latter adjustment, knife 22 is kept from turning about bolt 52 by a pin 84 (FIGURE 2) which extends through apertures 96 and 98 in knife holder 26 and knife clamp member 28. One end 86 of pin 84 projects into a bore 88 in the ring support 30. The aperture 90 in knife 22 is elongated so as to allow movement of knife 22 in directions generally toward and away from the axis of rotation of the cutter head. The pin has a tight fit with the surface around aperture 98 and so is held firmly in place. The pin positively stops any turning movement or back and forth movement of the clamp 28 and the holder 26 relative to each other without putting these parts in tension.

By virtue of the simple design of the cutter head and support structure of the invention, a cost reduction has been achieved in comparison to previously known designs. Only one bolt is necessary to connect the knives, knife clamp and knife holder members with the support ring. This results in simplification of the parts which alleviates casting problems as well as reducing costs. The design is such that almost no tension forces are induced in the parts. Only the lug which holds the adjustment eye bolt in place is put in tension, and for this reason it is possible to reduce the mechanical properties of the material slightly and also perhaps reduce the cross section of the various parts.

I claim:

1. A chopper rotor having a center shaft, a mounting structure comprising spaced discs supported on said shaft for rotation therewith, a plurality of knife holder members carried by said discs with each member defining a seating surface for a portion of a knife, knife clamping members overlying the knife on said seating surfaces, means fastening said knife, said holder members and said clamping members to said discs, and holding means separate from said fastening means extending between each clamping member and holding member to prevent relative movement of said members.

2. A chopper rotor as defined in claim 1, wherein said fastening means comprises a bolt extending through portions of each of said seating surfaces, holder members, knife and clamping member and fastener means on said bolt for tightening the same, and in which said holding means comprises a pin spaced laterally of said bolt extending between and into said holder and said clamp.

3. A chopper rotor as defined in claim 2, further including adjusting means between said knife and said clamping member and means defining an enlarged opening in said knife receiving said bolt to allow adjustment of the position of said knife with respect to said discs.

4. A chopper rotor as defined in claim 3, wherein said adjusting means comprises a first bolt having an eye-type head and a shank, said shank being releasably and adjustably secured to said clamp holder member, and a second bolt extending through said knife and said eye-type head and fastened by a nut to said head and knife.

5. In a device for cutting forage which includes a housing having an inlet and an outlet, and a rotor journalled in said housing for rotation having a plurality of knives spaced angularly about the axis of rotation of said rotor for cutting forage material entering said housing through said inlet and propelling the chopped material out of said housing through said outlet, the combination therewith of a rotary support structure for said knives comprising a plurality of discs supported for rotation on a shaft of said rotor structure, a plurality of knife holder members affixed to each of said discs at positions spaced angularly about the circumference of said disc, each of said knife holder members having a surface for seating one of said knives and further having an aperture through a portion thereof for receiving adjusting means for said one knife, a plurality of knife clamp members, each separate from and overlapping a respective one of said knives and knife holder members, means fastening said knives and said holder and clamp members to said discs, and a pin extending between and into said holder and said clamp to prevent movement thereof relative to each other.

References Cited

UNITED STATES PATENTS

| 1,550,592 | 8/1925 | Strickler | 146—118 |
| 1,929,586 | 10/1933 | Holland-Letz | 146—121 |
| 2,829,695 | 4/1958 | Jarvis | 146—121 |
| 3,126,931 | 3/1964 | Blanshine | 146—107 |
| 3,331,561 | 7/1967 | Morkoski | 241—192 |

W. GRAYDON ABERCROMBIE, *Primary Examiner.*